(12) United States Patent
Hunter et al.

(10) Patent No.: US 11,199,404 B1
(45) Date of Patent: Dec. 14, 2021

(54) CAMERA TRIGGERING AND MULTI-CAMERA PHOTOGRAMMETRY

(71) Applicant: Baker Hughes Holdings LLC, Houston, TX (US)

(72) Inventors: Rick Hunter, Houston, TX (US); Mars Chu, Houston, TX (US); Thai Hoang, Houston, TX (US); James Hyatt, Houston, TX (US); Ghulam A. Baloch, Houston, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 0 days.

(21) Appl. No.: 17/116,526

(22) Filed: Dec. 9, 2020

(51) Int. Cl.
| | |
|---|---|
| *H04N 7/18* | (2006.01) |
| *G01C 11/02* | (2006.01) |
| *H04N 5/247* | (2006.01) |
| *G01P 5/00* | (2006.01) |
| *H04N 5/232* | (2006.01) |
| *H04N 5/225* | (2006.01) |

(52) U.S. Cl.
CPC .......... *G01C 11/02* (2013.01); *G01P 5/00* (2013.01); *H04N 5/23203* (2013.01); *H04N 5/247* (2013.01); *H04N 5/2253* (2013.01)

(58) Field of Classification Search
CPC ......... G06T 2207/30188; G06T 7/0004; G06T 2207/10021; G06T 2207/10028; G06T 7/73; G06T 2207/10024; G01V 3/26; G01V 15/00; G01V 1/3852; G01V 1/42; G01V 1/04; G01V 11/002; G01V 11/007
USPC .......................................................... 348/148
See application file for complete search history.

(56) References Cited

U.S. PATENT DOCUMENTS

| | | | | |
|---|---|---|---|---|
| 2008/0278314 | A1* | 11/2008 | Miller | G07C 5/008 340/539.13 |
| 2010/0182396 | A1* | 7/2010 | Kroepfl | B60R 1/00 348/36 |
| 2016/0083115 | A1* | 3/2016 | Hess | B64C 39/022 701/3 |
| 2021/0163021 | A1* | 6/2021 | Frazzoli | H04W 4/00 |

* cited by examiner

*Primary Examiner* — Masum Billah
(74) *Attorney, Agent, or Firm* — Mintz Levin Cohn Ferris Glovsky and Popeo, PC; Lisa Adams

(57) ABSTRACT

A photogrammetry system includes a memory, a processor, and a geo-positioning device. The geo-positioning device outputs telemetry regarding a vehicle on which one or more cameras are mounted. The processor can receive first telemetry from the geo-positioning device characterizing the vehicle telemetry at a first time, camera specification(s) regarding the cameras, photogrammetric requirement(s) for captured images, and a last camera trigger time. The processor can determine a next trigger time for the cameras based upon the received telemetry, camera specification(s), photogrammetric requirement(s), and last trigger time. The processor can transmit a trigger signal to the camera(s) and the geo-positioning device to cause the camera(s) to acquire images of a target and the geo-positioning device to store second vehicle telemetry data characterizing the vehicle telemetry at a second time that is after the first time and during acquisition of the images. The processor can receive the acquired images from the cameras.

22 Claims, 5 Drawing Sheets

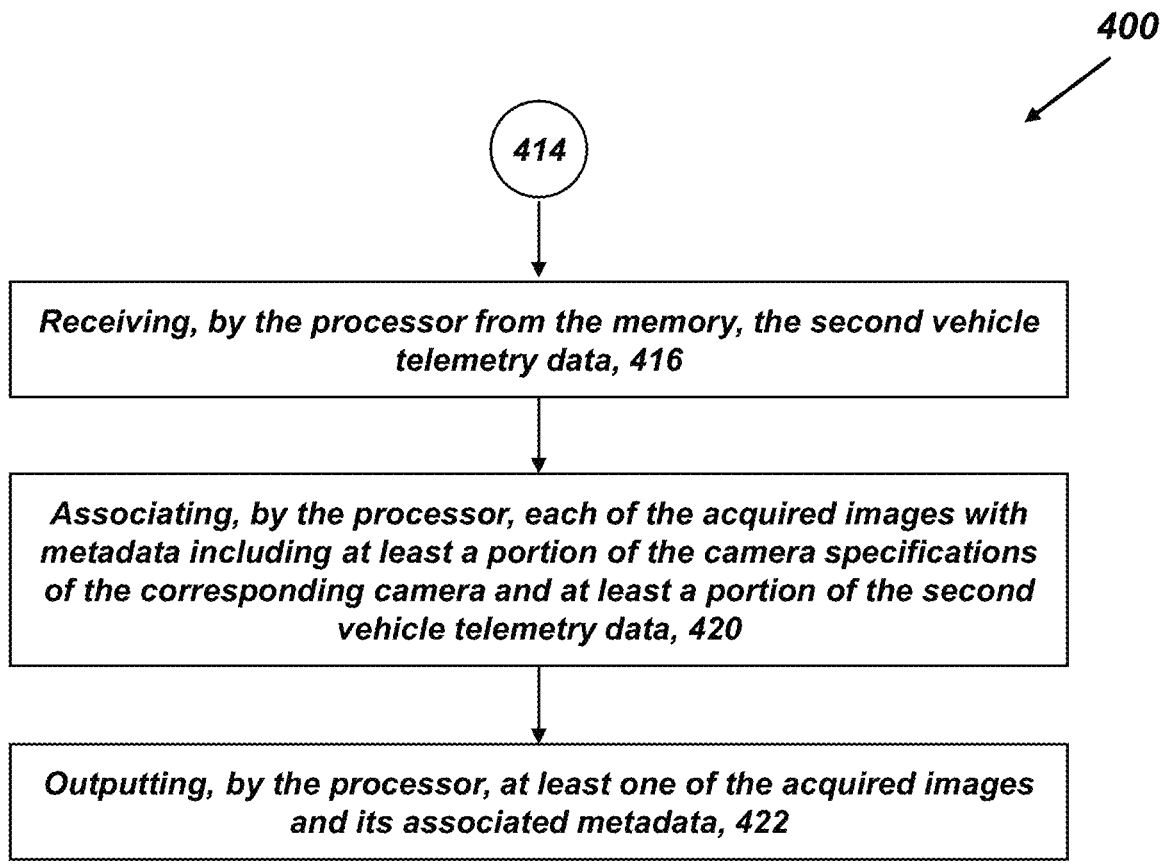
FIG. 4 (con't)

CAMERA TRIGGERING AND MULTI-CAMERA PHOTOGRAMMETRY

BACKGROUND

Visual inspection is regularly performed on equipment and other infrastructure located at industrial sites as part of maintenance, risk reduction, and/or regulatory compliance programs. As an example, visual observations can be recorded and used in conjunction with photogrammetric tools to produce three-dimensional models of a site. The models can be used for applications such as identifying visible defects for preventative maintenance, auditing inventories, visualizing security vulnerabilities, and satisfying regulatory requirements, amongst others.

SUMMARY

Photogrammetry systems employed for industrial sites are commonly based on unmanned aerial vehicles (UAVs) and capture color images (e.g., RGB images) from a single RGB camera. The captured images, and sometimes metadata, captured from these systems is input into a photogrammetry tool to produce three-dimensional models.

In general, the conditions under which a camera is triggered to acquire an image is configured prior to launch of the UAV. In one example, a camera can be configured to trigger and capture images at particular locations. In another example, the camera can be configured to capture images at a certain frequency (number of images per unit time). Such triggering configurations can be undesirable, as they can result in two few images or too many images. In one aspect, to ensure coverage of a surveyed site, single cameras require longer flight times and more time in the field. In another aspect, to capture high quality images, existing photogrammetry systems can require the UAV to hold position prior to capture of each image, further increasing the surveying time.

Embodiments of the disclosure improved photogrammetry systems and corresponding methods of use. As discussed in greater detail below, the photogrammetry systems and methods presented herein are configured for use with multiple cameras, ensuring that a desired coverage area can be surveyed more quickly than single camera photometry systems. Survey time is further reduced by the ability to acquire images while the vehicle is moving. The disclosed photogrammetry systems and methods are further configured to ensure that the right amount of images are captured.

In an embodiment, photogrammetry system is provided and it can include a memory, a survey-grade geo-positioning device, and at least one processor. The survey-grade geo-positioning device can be configured to output telemetry regarding a vehicle. The at least one processor can be in communication with the memory, the geo-positioning device, and one or more cameras mounted to the vehicle. The at least one processor can be further configured to receive at least one first vehicle telemetry from the geo-positioning device characterizing the vehicle telemetry at a first time. The at least one processor can also be configured to receive at least one camera specification regarding the cameras. The at least one processor can be further configured to receive at least one photogrammetric requirement for images captured by the cameras. The at least one processor can also be configured to receive a last trigger time of the cameras. The at least one processor can additionally be configured to determine a next trigger time for the cameras based upon the received vehicle telemetry, camera specification, photogrammetric requirement, and last trigger time.

The at least one processor can also be configured to transmit a trigger signal concurrently to the cameras and the geo-positioning device. The trigger signal can be operative to cause, upon receipt, acquisition of images of a target by the cameras, and storage of at least one second vehicle telemetry data in the memory by the geo-positioning device. The second vehicle telemetry data can characterize the vehicle telemetry at a second time that is after the first time and during acquisition of the images. The at least one processor can be further configured to receive the acquired images from the cameras.

In an embodiment, the at least one processor can be further configured to receive, from the memory, the second vehicle telemetry data. The at least one processor can also be configured to associate each of the acquired images with metadata including at least a portion of the camera specifications of the corresponding camera and at least a portion of the second vehicle telemetry data. The at least one processor can be additionally configured to output at least one of the acquired images and its associated metadata.

In an embodiment, the system can further include at least one environmental sensor in communication with the at least one processor. The at least one environmental sensor can be configured to measure a wind speed at the vehicle. The at least one processor can be further configured to determine the next trigger time based upon the wind speed.

In an embodiment, the camera specification can include at least one of a sensor size, a lens size, a shutter speed, an aperture, an ISO, a stabilization, a field of view, or a frame rate.

In an embodiment, the vehicle telemetry can include at least one of a location of the vehicle, an orientation of the vehicle, speed of the vehicle, or acceleration of the vehicle.

In an embodiment, the location of the vehicle can include at least one of latitude, longitude, or altitude.

In an embodiment, orientation of the vehicle can include at least one of heating, pitch, yaw, or roll.

In an embodiment, the photogrammetric requirements can include forward overlap and lateral overlap.

In an embodiment, the trigger signal can be output to the cameras by a cable configured to electrically communicate with a hardware trigger of the cameras. The hardware trigger can be configured to trigger image acquisition upon receipt of the trigger signal.

In an embodiment, the at least one processor can be further configured to associate the metadata with the acquired images immediately upon receipt of the acquired images.

In an embodiment, the camera specification can be received from the cameras.

In an embodiment, a method for performing photogrammetry is provided. The method can include outputting, by a survey-grade geo-positioning device, telemetry regarding a vehicle. The method can also include receiving, by at least one processor, at least one first vehicle telemetry from the geo-positioning device characterizing the vehicle telemetry at a first time. The method can further include receiving, by the at least one processor, at least one camera specification for one or more cameras mounted to the vehicle. The method can additionally include receiving, by the at least one processor, at least one photogrammetric requirement for images captured by the cameras. The method can also include receiving, by the at least one processor, a last trigger time of the cameras. The method can further include determining, by the at least one processor, a next trigger time for the cameras based upon the received vehicle telemetry, the camera specification, the photogrammetric requirement, and the last trigger time. The method can also include transmitting, by the at least one processor, a trigger signal concurrently to the cameras and the geo-positioning device. The method can further include acquiring, by the cameras, images in response to receipt of the trigger signal. The method can additionally include storing, by the geo-positioning device in a memory, at least one second vehicle telemetry data characterizing the vehicle telemetry at a second time that is after the first time and during acquisition of the images. The method can also include receiving, by the at least one processor from the cameras, the acquired images.

In an embodiment, the method can further include receiving, by the at least one processor, the second vehicle telemetry data. The method can also include associating, by the at least one processor, each of the acquired images with metadata including at least a portion of the camera specifications of the corresponding camera and at least a portion of the second vehicle telemetry data. The method can additionally include outputting, by the at least one processor, at least one of the acquired images and its associated metadata.

In an embodiment, at least one environmental sensor can be in communication with the at least one processor. The at least one environmental sensor can be configured to measure a wind speed at the vehicle. The at least one processor can be further configured to determine the next trigger time based upon the wind speed.

In an embodiment, the camera specification can include at least one of a sensor size, a lens size, a shutter speed, an aperture, an ISO, a stabilization, a field of view, or a frame rate.

In an embodiment, the vehicle telemetry can include at least one of a location of the vehicle, an orientation of the vehicle, speed of the vehicle, or acceleration of the vehicle.

In an embodiment, the location of the vehicle can include at least one of latitude, longitude, or altitude.

In an embodiment, the orientation of the vehicle can include at least one of heating, pitch, yaw, or roll.

In an embodiment, the photogrammetric requirements can include forward overlap and lateral overlap.

In an embodiment, the trigger signal can be transmitted to the cameras via a cable coupled to a hardware trigger. Image acquisition can be triggered by receipt of the trigger signal at the hardware trigger.

In an embodiment, the at least one processor can associate the metadata with the acquired images immediately upon receipt of the acquired images.

In an embodiment, the camera specification can be received from the cameras.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Visual inspection is regularly performed on equipment and other infrastructure located at industrial sites. Often, inspection is performed using cameras mounted to vehicles, and the images are subsequently used to generate three-dimensional models of the inspected site. The models can be used, for example, to identify current problems and/or predict problems before they arise. Existing inspection systems commonly trigger the cameras to acquire images based upon criteria determined in advance of the survey, such as image acquisition at pre-set locations or a pre-set frequency (number of images per time). However, such triggering cannot be changed during the survey and can result in too many or too few images being acquired. Acquisition of too many images can increase the inspection time and cost, while acquisition of too few images can result in poor quality models. Accordingly, photogrammetry systems and corresponding methods of use are provided that allow camera triggering to be determined in real-time during a survey. Camera triggering can be based upon highly accurate, real-time position information, camera specifications, and modeling requirements. In this manner, the right amount of images can be acquired. As vehicle telemetry is accounted for when determining camera triggering, images can be acquired during motion of the vehicle, reducing the survey time. Optionally, multiple cameras can be employed, further reducing the survey time.

Figure 1:
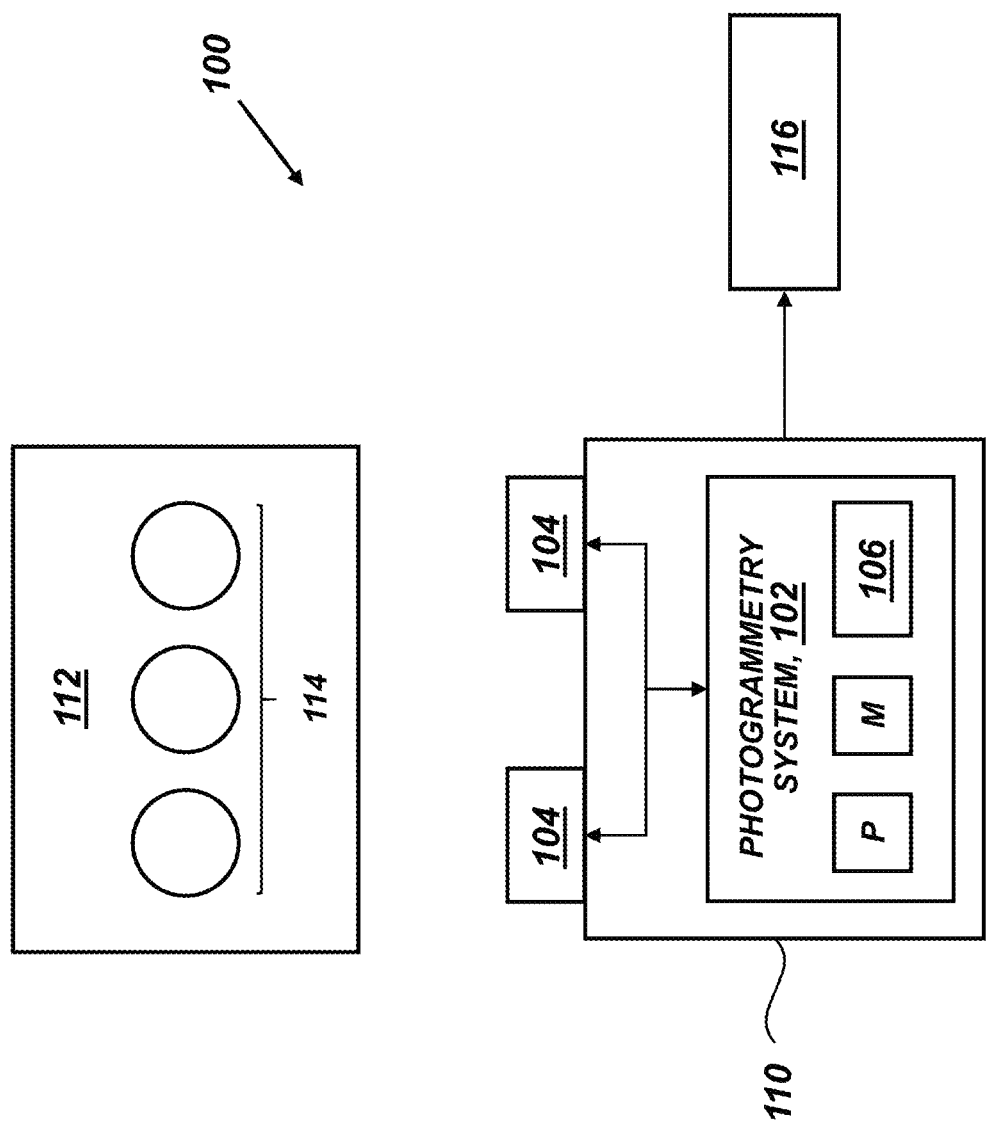
FIG. 1 is a schematic line drawing illustrating one exemplary embodiment of an operating environment including a photogrammetry system configured to trigger acquisition of images of a target by one or more cameras.

FIG. 1 is a schematic line drawing illustrating an operating environment 100 including one exemplary embodiment of a photogrammetry system 102. The photogrammetry system 102 is configured to trigger one or more cameras 104 to acquire images of a target 114. The photogrammetry system 102 is further configured to output tagged images 116 that combine the acquired images with metadata suitable for use with photogrammetry tools for generating three-dimensional models. As shown, the photogrammetry system 102 includes at least one processor P in communication with a memory M, a high accuracy geo-positioning device 106, and the cameras 104.

Embodiments of the cameras 104 can be configured to acquire single images when triggered or video. Reference herein to images acquired the cameras can be understood to include frames extracted from video.

In use, the photogrammetry system 102 and the cameras 104 are mounted to a vehicle 110. The vehicle 110 can be any ground vehicle or aerial vehicle (e.g., cars, trucks, unmanned aerial vehicles (UAVs), etc.) The vehicle 110 moves towards a site 112 for acquisition of images of one or more targets 114 present within the site 112. Examples of targets 114 can include, but are not limited to, oil and gas exploration equipment (e.g., compressors, pumps, wellheads, storage tanks), transmission lines, wind turbines, manufacturing facilities, warehouse facilities, or other infrastructure (e.g., dams, bridges, airports, seaports, airfields, railroads, etc.) It can be understood, however, that embodiments of the disclosure are not limited to these targets and can be employed to acquire images of any target without limit.

During movement of the vehicle 110, the geo-positioning device 106 determines vehicle telemetry and transmits vehicle telemetry data to the processor P. The processor P further receives camera specification information from the cameras 104, photogrammetric requirements for the target 114 (e.g., overlap of adjacent images), and a time at which the cameras 104 were last triggered. With this information, the processor P determines a time for the next trigger and sends trigger signals to each of the cameras 104. Each of the cameras 104 acquires images in response to receipt of a trigger signal.

The processor P can subsequently associate the acquired images with metadata suitable for use with photogrammetry tools for generating three-dimensional models. The metadata can include, but is not limited to, vehicle telemetry data acquired at about the same time as the images are captured and camera specification information. Association of the acquired images with the metadata can be performed in real-time, immediately after the images are acquired, or at a later time.

Beneficially, the real-time vehicle telemetry data can provide more information about the motion and location of the vehicle than a simple location. In combination with the camera specifications and the photogrammetric requirements, the selected trigger times can ensure that the right amount of images are captured, avoiding situations where too many or too few images are captured, as commonly occurs when camera triggers are based upon simple geo-location and/or timing. By avoiding acquisition of too many images, the time required in the field to survey a desired coverage area can be reduced. Survey time can be further reduced as the photogrammetry system 102 can trigger image acquisition while the vehicle 110 is moving, rather than requiring the vehicle to hold position.

Figure 2:
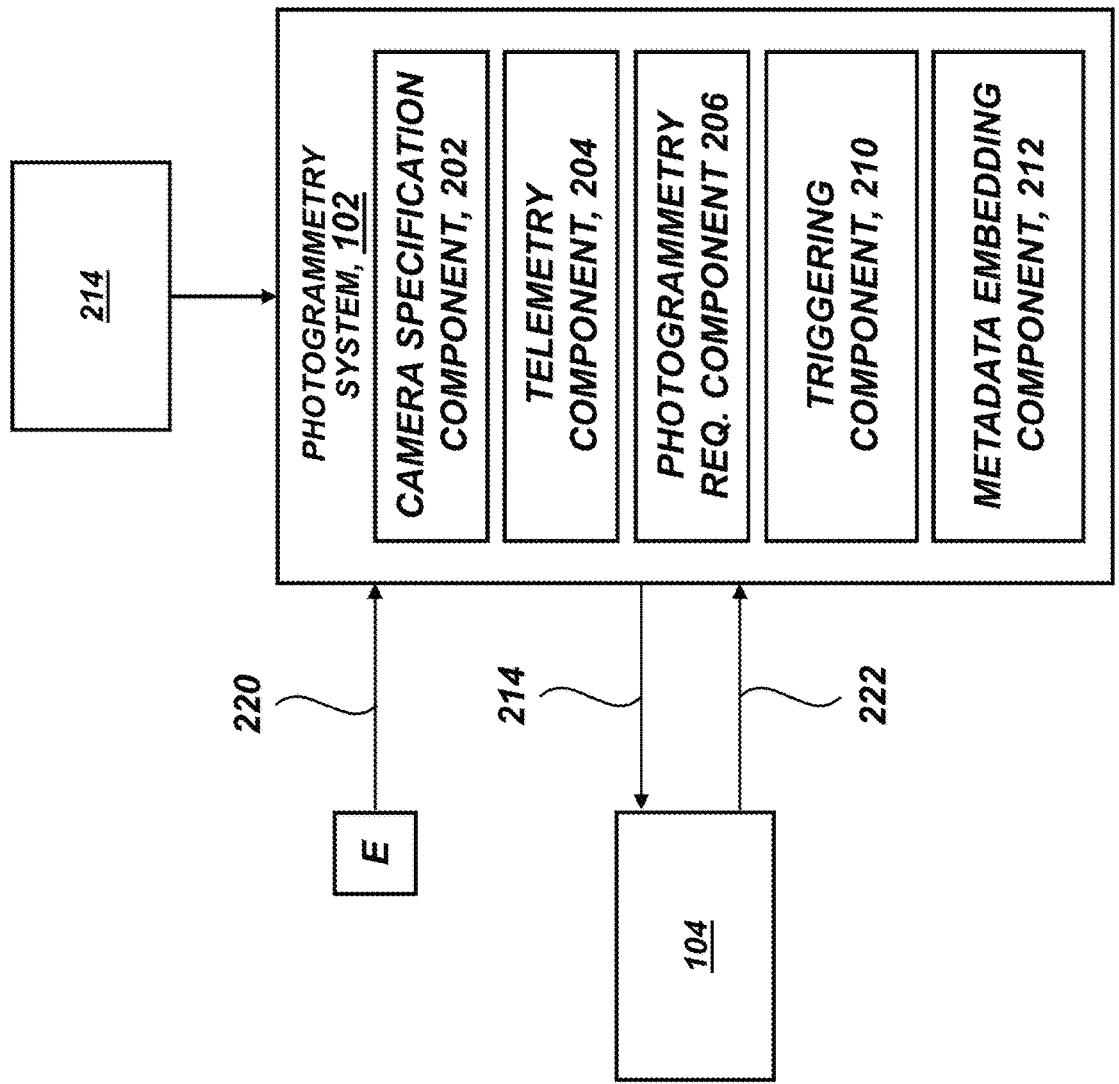
FIG. 2 is a schematic line drawing illustrating the photogrammetry system of FIG. 1 in greater detail.

FIG. 2 is a schematic line drawing illustrating the photogrammetry system 102 in greater detail. As shown, the photogrammetry system 102 is in communication with the cameras 104 and includes a camera specification component 202, a telemetry component 204, a photogrammetry requirements component 206, a triggering component 210, and a metadata association component 212. The functionality of the components, discussed in detail below, can be implemented using the one or more processors P and memory M.

The camera specification component 202 can be configured to receive and store camera specification information in the memory M. Examples of the camera specification include, but are not limited to image size (e.g., sensor size, lens size) and image quality (e.g., shutter speed, aperture, ISO, stabilization, etc.), field of view, frame rate, and the like. In some embodiments, the camera specification information can be received from a user computing device 214 in communication with the photogrammetry system 102. In other embodiments, the camera specification information can be received from the cameras 104. In further embodiments, the camera specification information can be received from both the user computing device 214 and the cameras 104. The camera specification information can be received during runtime or in advance of runtime.

The telemetry component 204 can be configured to receive and store telemetry information regarding the vehicle 110 in the memory M. Examples of telemetry information can include, but are not limited to, one or more of location (e.g., latitude/longitude, altitude), orientation (e.g., heating, pitch/roll/yaw), or motion (e.g., velocity in three dimensions, acceleration in three dimensions).

In one embodiment, the telemetry component 204 can receive the telemetry information from the high accuracy geo-positioning device 106. In general, embodiments of the high accuracy geo-positioning device 106 can be any geo-location device configured to provide location information (e.g., horizontal and vertical) at a desired level of accuracy. In one example, of the high accuracy geo-positioning device can be include survey-grade receivers. The accuracy of such devices can be on the order of centimeters (e.g., about 1 cm to about 10 cm, about 1 cm to about 5 cm to about 3 cm, etc.) In further embodiments, the geo-positioning device can be configured to user precise point positioning (PPP), a global navigation satellite (GNSS) positioning technique that calculates very precise positions, with centimeter-level accuracy. Accordingly, embodiments of the geo-positioning device 106 can be configured to determine the at least the horizontal and vertical position of the vehicle 110 with accuracy within about 1 cm to about 10 cm.

It can be appreciated, however, that the telemetry component 204 can receive the telemetry information from other sources, as necessary. Examples of such other sources can include, but are not limited to, flight recorders, GPS devices, barometers, accelerometers, and the like.

The photogrammetry requirements component 206 can be configured to receive and store photogrammetric requirements in the memory M. The photogrammetric requirements can be dictated by one or more sources. Examples of sources can include photogrammetric three-dimensional modeling tools or a user/customer. In certain embodiments, the photogrammetric requirements can be received from the user computing device 214.

Figure 3:
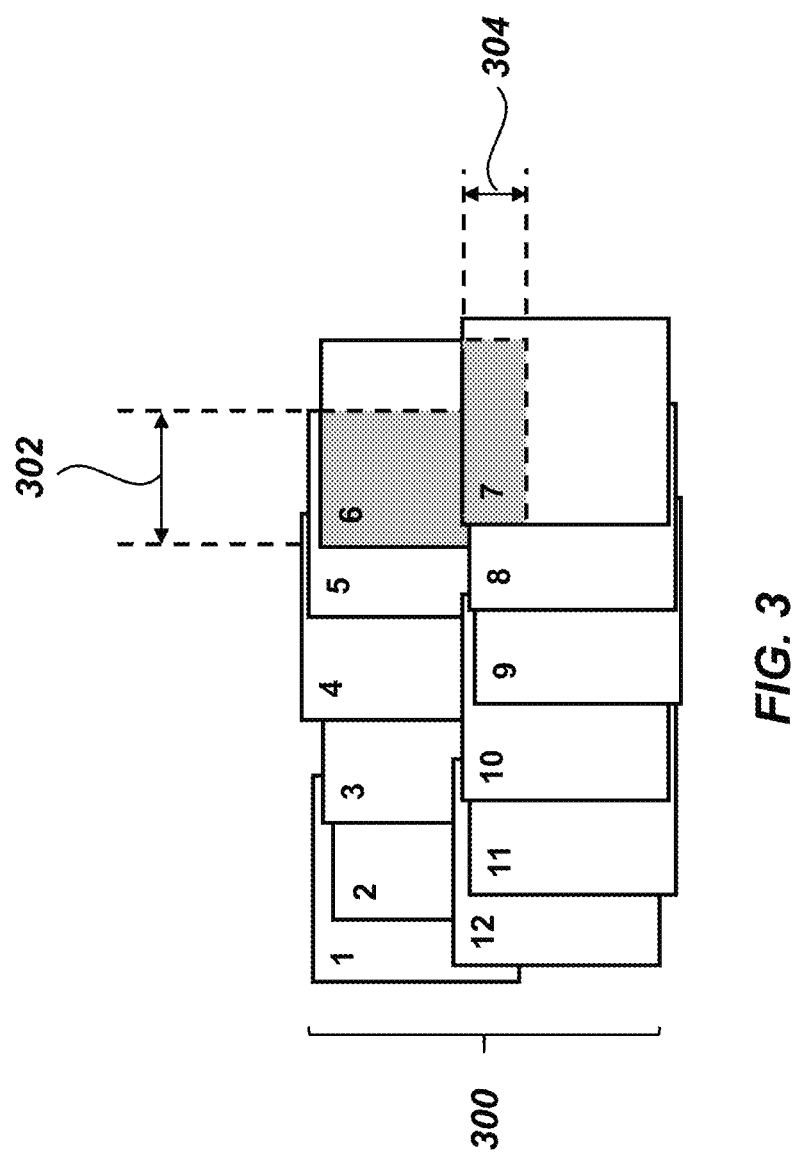
FIG. 3 is a schematic line drawing illustrating overlapping images captured by the one or more cameras of FIG. 1.

In one aspect, the photogrammetric requirements can include overlap of adjacent captured images. FIG. 3 illustrates captured images 300, labeled 1 through 12. Images 1-6 and 7-12 extend from left to right in respective rows, where images 7-12 overlie images 1-6. Moving from left to right, each image overlies those to the left (e.g., image 2 overlies image 1, image 11 overlies image 12, etc.). The photogrammetric requirement of forward overlap 302 refers to the portion of one image that overlies another image in the forward direction (e.g., the rightward direction). The photogrammetric requirement of lateral overlap 304 refers to the portion of one image that overlies another image in the lateral direction (e.g., the downward direction).

In another aspect, the photogrammetric requirements can include a ground sampling distance (GSD). GSD pertains to images of the ground taken from the air and refers to the distance between pixel centers measured on the ground. For example, in an image having a one meter GSD, adjacent pixels locations within the image are one meter apart on the ground.

The triggering component 210 is configured to receive the camera specification information, the vehicle telemetry information, and the photogrammetric requirements from the components 202, 204, 206, as discussed above. The last camera trigger time can be received from the cameras 104. Based upon this received information, the triggering component 210 determines the time of the next camera trigger. The vehicle telemetry information can be first vehicle telemetry information determined at the time the next camera trigger time is determined. Subsequently, the triggering component 210 generates triggers the cameras 104 (e.g., by outputting a trigger signal 216).

Optionally, the photogrammetry system 102 can be in further communication with an environmental sensor E. The environmental sensor E can be configured to measure one or more environmental parameters regarding the environment surrounding the vehicle 110 and transmit an environmental signal 220 to the photogrammetry system 102 (e.g., the at least one processor P) representing the measured environmental parameter(s). As an example, one or more environmental parameters can include a wind speed adjacent to the vehicle 110. The triggering component 210 can be further configured to determine the next trigger time based upon the wind speed.

The cameras 104 can be triggered in a variety of ways. In one aspect, camera triggering can be software based. In another aspect, camera triggering can be hardware based. As an example, the cameras 104 can include dedicated trigger inputs. Cables are connected from the photogrammetry system 102 to the trigger inputs of respective cameras 104, and the trigger signal 216 is transmitted to the cameras 104 by the cables.

In certain embodiments, the cameras 104 can be triggered asynchronously. Under this configuration, the last trigger time received by the triggering component 210 can be different for each of the cameras 104.

In other embodiments, the cameras 104 can be triggered synchronously. As an example, using the hardware-based triggering discussed above, each of the trigger inputs can be connected together. Thus, each of the cameras 104 can receive the trigger signal 216 at about the same time, synchronizing image capture between respective cameras 104. Under this configuration, the last trigger time received by the triggering component 210 can be the same for each of the cameras 104.

In general, as the accuracy of the location at which images are captured increases, the quality of the resulting three-dimensional model. It can be appreciated, however, that there can be a time delay between the time at which telemetry information is determined by the telemetry component 204 and the time when images are acquired by the cameras 104. Such delays introduce error into the three-dimensional models, as location at which images are acquired differs from the location recorded by the telemetry component 204.

Embodiments of the photogrammetry system 102 are configured to reduce this time delay as much as possible. A first portion of the time delay can be attributed to the time between transmission of the trigger signal 216 and image acquisition by the cameras 104. A second portion of the time delay can be attributed to the time between transmission of the trigger signal 216 and determination of the telemetry information by the telemetry component 204.

To address the first portion of the time delay, the settings of the cameras 104 can be selected such that images are acquired at about the same time that the trigger signal 216 is transmitted by the photogrammetry system 102 (e.g., within milliseconds). As an example, features such as auto-focus can be disabled.

To address the second portion of the time delay, the telemetry component 204 can be configured to determine the telemetry information at about the same time that the trigger signal 216 is transmitted. As an example, the geo-positioning device 106 can be configured to receive external inputs, and the external inputs can be tied to the cables discussed above that carry the trigger signal 216 to the cameras 104. In the manner, the same trigger signal 216 that triggers image acquisition also triggers the geo-positioning device 106 to log the vehicle telemetry information. This vehicle telemetry information can be second vehicle telemetry information determined at about the time the trigger signal 216 is transmitted or at a predetermined time during image acquisition (e.g., at the middle of the exposure).

The metadata association component 212 can be configured to receive the images acquired by respective cameras 104 and the second vehicle telemetry information and store both in the memory M. As an example, the metadata association component 212 can receive one or more camera signals 222 containing the acquired images. Subsequently, at least a portion of the second vehicle telemetry information and at least a portion of the camera specification information, referred to collectively as metadata, can be associated with each captured image.

The metadata association can be in the form of a stand-alone index file or it can be added to the image's exif (exchangeable image file format). In certain embodiments, the metadata association can be performed by the metadata association component 212 in real-time. That is, immediately after the images are acquired and received by the metadata association component. In other embodiments, the metadata association can be performed at a later time. In further alternative embodiments, the metadata and acquired images received by the metadata association component 212 can be output to an external computing device for association.

Figure 4:
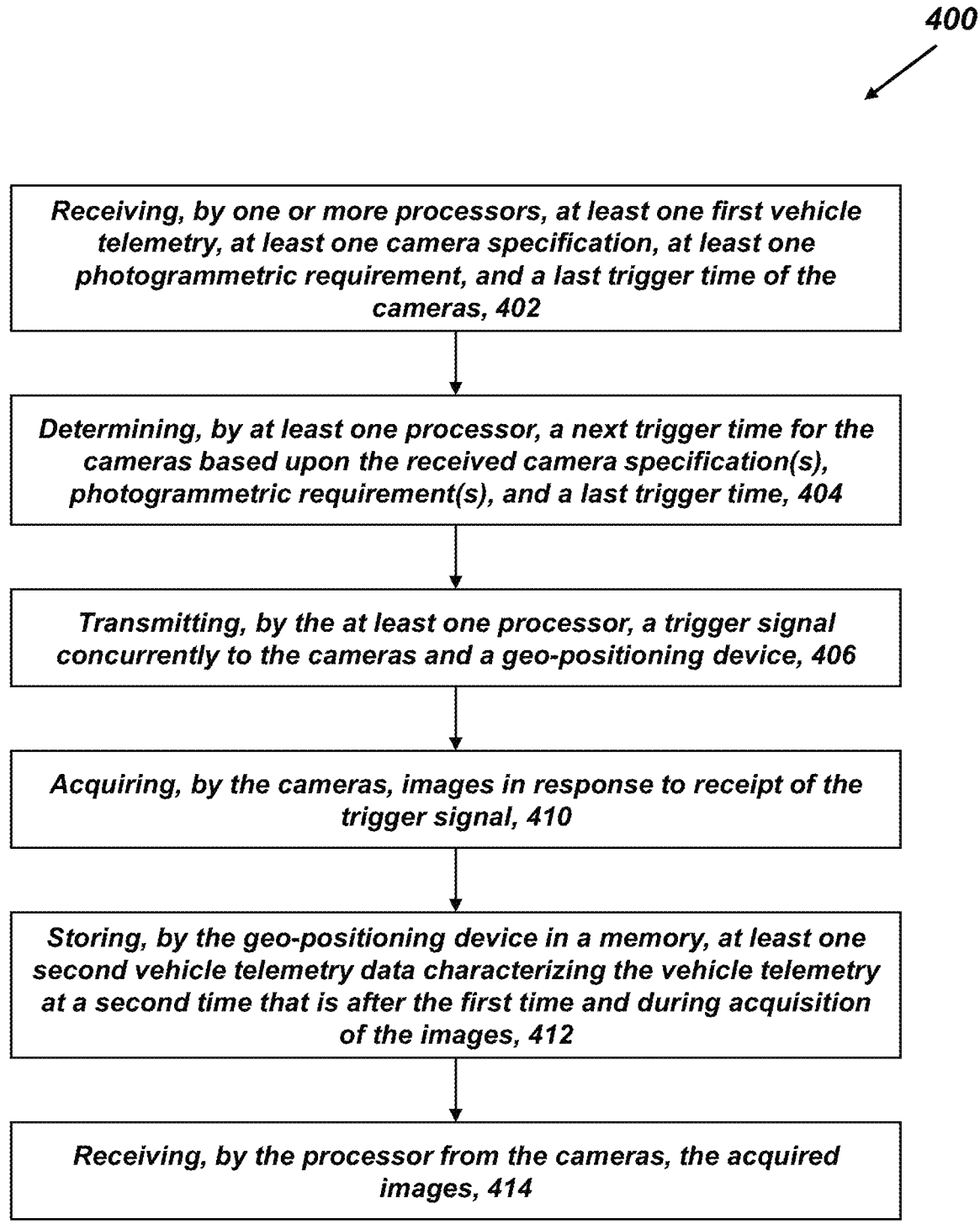
FIG. 4 is a flow diagram illustrating one exemplary embodiment of a method for performing photogrammetry employing the photogrammetry system of FIG. 1.

FIG. 4 is a flow diagram illustrating one exemplary embodiment of a method 400 for photogrammetry that can be performed by the photogrammetry system 102. As shown, the method 400 includes operations 402-414. Optionally, the method 400 can further include operations 416-422. In alternative embodiments, the method can include greater or fewer operations than illustrated in FIG. 4 and the operations can be performed in a different order than illustrated in FIG. 4.

In operation 402, the at least one processor P receives at least one first vehicle telemetry. The vehicle telemetry can characterize the vehicle telemetry at a first time (e.g., immediately prior to receipt by the processor P) and can be determined by the geo-positioning device 106. The geo-positioning device 106 can be a survey-grade geo-positioning device. The at least one processor P can also receive at least one camera specification and a last trigger time from one or more cameras 104 mounted to the vehicle 110. The at least one processor P can further receive at least one photogrammetric requirement (e.g., from the user computing device 214).

In operation 404, the at least one processor P can determine a next trigger time for the cameras 104 based upon the received vehicle telemetry, camera specification(s), photogrammetric requirement(s), and the last trigger time.

Optionally, the at least one processor P can also receive measurements of one or more environmental parameters from the environmental sensor E (e.g., the wind speed at the vehicle 110). The at least one processor P can be further configured to determine a next trigger time for the cameras 104 based upon the received environmental parameter(s).

In operation 406, the at least one processor P can transmit a trigger signal concurrently to the cameras and the geo-positioning device. Under this circumstance, the cameras can be triggered substantially synchronously by a single trigger signal. However, in alternative embodiments, the at least one processor P can transmit trigger signals at different times to respective cameras. Under this circumstance, the cameras can be triggered substantially asynchronously.

In operation 410, the cameras 104 can acquire images in response to receipt of the trigger signal 216.

In operation 412, the geo-positioning device 106 can determine at least one second vehicle telemetry data characterizing the vehicle telemetry at a second time that is after the first time and during acquisition of the images. The geo-positioning device 106 can further store the at least one second vehicle telemetry data in the memory M.

In operation 414, the at least one processor can receive the acquired images from the cameras 104.

As noted above, the method 400 can optionally include operations 416-422, discussed in detail below.

In operation 416, the at least one processor P can receive the second vehicle telemetry data.

In operation 420, the at least one processor P can associate each of the acquired images with metadata. The metadata can include at least a portion of the camera specifications of the corresponding camera and at least a portion of the second vehicle telemetry data.

In operation 422, the at least one processor P can output at least one of the acquired images and its associated metadata.

Exemplary technical effects of the methods, systems, and devices described herein include, by way of non-limiting example, the ability to adjust camera triggering in real-time during a survey to acquire images. The adjustment can be based upon vehicle telemetry, camera specifications, and photogrammetry requirements, thereby ensuring that the right amount of images are captured, neither too many nor too few. As vehicle telemetry is accounted for when determining camera triggering, images can be acquired during motion of the vehicle, reducing the survey time. Optionally, multiple cameras can be employed, further reducing the survey time.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A photogrammetry system, comprising:
   a memory;
   a survey-grade geo-positioning device configured to output telemetry regarding a vehicle;
   at least one processor in communication with the memory, the geo-positioning device, and one or more cameras mounted to the vehicle, the at least one processor being configured to:
   receive at least one first vehicle telemetry from the geo-positioning device characterizing the vehicle telemetry at a first time;
   receive at least one camera specification regarding the cameras;
   receive at least one photogrammetric requirement for images captured by the cameras;
   receive a last trigger time of the cameras;
   determine, a next trigger time for the cameras based upon the received vehicle telemetry, camera specification, photogrammetric requirement, and last trigger time;
   transmit a trigger signal concurrently to the cameras and the geo-positioning device, wherein the trigger signal is operative to cause, upon receipt:
   acquisition of images of a target by the cameras;
   storage of at least one second vehicle telemetry data in the memory by the geo-positioning device, the second vehicle telemetry data characterizing the vehicle telemetry at a second time that is after the first time and during acquisition of the images; and
   receive the acquired images from the cameras.

2. The system of claim 1, wherein the processor is further configured to:
   receive, from the memory, the second vehicle telemetry data;
   associate each of the acquired images with metadata including at least a portion of the camera specifications of the corresponding camera and at least a portion of the second vehicle telemetry data; and
   output at least one of the acquired images and its associated metadata.

3. The system of claim 1, further comprising at least one environmental sensor in communication with the at least one processor, wherein the at least one environmental sensor is configured to measure a wind speed at the vehicle, and wherein the at least one processor is further configured to determine the next trigger time based upon the wind speed.

4. The system of claim 1, wherein the camera specification comprises at least one of a sensor size, a lens size, a shutter speed, an aperture, an ISO, a stabilization, a field of view, or a frame rate.

5. The system of claim 1, wherein the vehicle telemetry comprises at least one of a location of the vehicle, an orientation of the vehicle, speed of the vehicle, or acceleration of the vehicle.

6. The system of claim 4, wherein the location of the vehicle comprises at least one of latitude, longitude, or altitude.

7. The system of claim 4, wherein orientation of the vehicle comprises at least one of heating, pitch, yaw, or roll.

8. The system of claim 1, wherein the photogrammetric requirements comprise forward overlap and lateral overlap.

9. The system of claim 1, wherein the trigger signal is output to the cameras by a cable configured to electrically communicate with a hardware trigger of the cameras, the hardware trigger being configured to trigger image acquisition upon receipt of the trigger signal.

10. The system of claim 2, wherein the at least one processor is configured to associate the metadata with the acquired images immediately upon receipt of the acquired images.

11. The system of claim 1, wherein the camera specification is received from the cameras.

12. A method for performing photogrammetry, comprising:
   outputting, by a survey-grade geo-positioning device, telemetry regarding a vehicle;
   receiving, by at least one processor, at least one first vehicle telemetry from the geo-positioning device characterizing the vehicle telemetry at a first time;
   receiving, by the at least one processor, at least one camera specification for one or more cameras mounted to the vehicle;
   receiving, by the at least one processor, at least one photogrammetric requirement for images captured by the cameras;
   receiving, by the at least one processor, a last trigger time of the cameras;
   determining, by the at least one processor, a next trigger time for the cameras based upon the received vehicle telemetry, the camera specification, the photogrammetric requirement, and the last trigger time;
   transmitting, by the at least one processor, a trigger signal concurrently to the cameras and the geo-positioning device;

acquiring, by the cameras, images in response to receipt of the trigger signal;

storing, by the geo-positioning device in a memory, at least one second vehicle telemetry data characterizing the vehicle telemetry at a second time that is after the first time and during acquisition of the images; and receiving, by the at least one processor from the cameras, the acquired images.

13. The method of claim 12, further comprising:

receiving, by the at least one processor, the second vehicle telemetry data;

associating, by the at least one processor, each of the acquired images with metadata including at least a portion of the camera specifications of the corresponding camera and at least a portion of the second vehicle telemetry data; and outputting, by the at least one processor, at least one of the acquired images and its associated metadata.

14. The method of claim 12, further comprising at least one environmental sensor in communication with the at least one processor, wherein the at least one environmental sensor is configured to measure a wind speed at the vehicle, and wherein the at least one processor is further configured to determine the next trigger time based upon the wind speed.

15. The method of claim 12, wherein the camera specification comprises at least one of a sensor size, a lens size, a shutter speed, an aperture, an ISO, a stabilization, a field of view, or a frame rate.

16. The method of claim 12, wherein the vehicle telemetry comprises at least one of a location of the vehicle, an orientation of the vehicle, speed of the vehicle, or acceleration of the vehicle.

17. The method of claim 16, wherein the location of the vehicle comprises at least one of latitude, longitude, or altitude.

18. The method of claim 16, wherein orientation of the vehicle comprises at least one of heating, pitch, yaw, or roll.

19. The method of claim 12, wherein the photogrammetric requirements comprise forward overlap and lateral overlap.

20. The method of claim 12, wherein the trigger signal is transmitted to the cameras via a cable coupled to a hardware trigger, and wherein image acquisition is triggered by receipt of the trigger signal at the hardware trigger.

21. The method of claim 13, wherein the at least one processor associates the metadata with the acquired images immediately upon receipt of the acquired images.

22. The method of claim 12, wherein the camera specification is received from the cameras.

* * * * *